United States Patent [19]

Trujillo

[11] 4,221,603
[45] Sep. 9, 1980

[54] MIX DESIGN METHOD FOR ASPHALT PAVING MIXTURES

[75] Inventor: Jose A. Trujillo, Holbrook, Ariz.

[73] Assignee: Riguez Associates, a Limited Partnership, Bethesda, Md.

[21] Appl. No.: 23,390

[22] Filed: Mar. 23, 1979

Related U.S. Application Data

[63] Continuation-in-part of Ser. No. 764,336, Jan. 29, 1977, abandoned.

[51] Int. Cl.$^2$ .............................................. C08L 95/00
[52] U.S. Cl. ................................. 106/281 R; 404/17
[58] Field of Search ............... 106/275, 276, 280, 281, 106/283; 259/155–159 R; 404/17

[56] References Cited

PUBLICATIONS

"Proceedings of the Ass. of Asphalt Paving Technologist", vol. 34, Feb. 1965, pp. 574–593.
"Proceedings of the Ass. of Asphalt Paving Technologist", vol. 31, Jan. 1962, pp. 176–207.
"Mix Design Methods for Asphalt Concrete", Mar. 1974, The Asphalt Institute, Series MS-2.

*Primary Examiner*—Carman J. Seccuro
*Attorney, Agent, or Firm*—Lawrence Harbin

[57] ABSTRACT

A mix design method for determining the gradation of coarse and fine aggregates to be combined to achieve a predetermined percentage of air void volume and voids in mineral aggregates for a given quantity of asphalt cement. The method uses a volumetric value known as the Riguez Index which is derived from a compacted representative sample of fine aggregates to be used in the mixing plant. Volumes of graded aggregate composites are calculated at various gradation values below the bulking point and compared with the Riguez Index thereby providing the basis for graphically selecting a particular gradation wherein an aggregate mixture of said particular gradation contains, when compacted, the desired predetermined void volumes. Coarse aggregates and fine aggregates are demarcated by the No. 4 screen.

5 Claims, 8 Drawing Figures

MIX DESIGN METHOD FOR ASPHALT PAVING MIXTURES

CROSS REFERENCES TO RELATED APPLICATIONS

This is a continuation-in-part of Ser. No. 764,336 filed Jan. 29, 1977, now abandoned.

This application is related to co-pending U.S. application Ser. No. 123,207 filed Feb. 21, 1980 entitled UNIFORM ASPHALT PAVEMENT AND PRODUCTION METHOD THEREFORE;

Ser. No. 123,206 filed Feb. 21, 1980 entitled ASPHALT MIXING PLANT WITH PLURAL WEIGHT CELLS; and Ser. No. 123,205 filed Feb. 21, 1980 entitled UNSEGREGATOR SHROUD FOR HOT-MIX ASPHALT LAY-DOWN MACHINE, each of which is filed by the same inventor.

BACKGROUND OF THE INVENTION

This invention concerns asphalt paving mix design and plant control methods, and more particularly, a method for determining and controlling the proportions of coarse aggregates, fine aggregates, and asphalt cement to be combined to produce optimum asphalt pavement mixtures in plant-mix type operations.

All asphalt pavement mix design is presently based upon knowledge and actual pavement experience of the contractor. It is purely a matter of judgement, thus resulting in a wide variety of standards and specifications.

Within the industry, there basically exists four types of asphalt road construction, Surface Treatment, Macadam Construction, Mixed-in-place Surfacing, and Plant Mix Type Construction.

The most advanced method of producing high quality pavements fall in the latter class of Plant Mix, to which this disclosure is related. In the Plant Mix Type method of pavement construction, a road bed and/or subgrade is prepared by grading, compacting and leveling to accommodate asphaltic pavement material to be placed thereon. The pavement mix is prepared at the site usually remote from the actual road surface and is carried to the road bed by truck prior to being leveled and compacted.

The primary purpose of a pavement is to transmit load from the surface to the subgrade or underlying soil. Because the pavement composite consists of aggregate generally varying in size from a mean diameter of 1½ inches to fine power passing the number 200 screen mesh, one can appreciate the respective functions of the different sized aggregates in order to properly prepare a mixture. The larger aggregates in the mixture carry the load by coming in close proximity with one another and the sand or fine aggregates fill interstices between the larger aggregate. A mixture having too little fine aggregates and too many air voids is classified as an "open graded mix" and is very vunerable to deterioration due to water seepage and aeration, (aeration will shorten the asphalt cement life due to oxidation; this effects the viscosity and hardness of the asphalt). Conversely, poor stability results from an asphalt pavement mix having too little coarse aggregates (or too much fine aggregates) and will not produce a road with proper load bearing qualities.

In this case, the load is not transmitted through the rock, but instead through the plastic mixture of the finer particles and the asphalt binder thereby resulting in a more pliable, "mushy" pavement having a shorter life span with yielding qualities, and uneven riding surfaces.

There exists an optimum mixture of coarse aggregates, fine aggregates, and asphalt cement which will produce a pavement having the longest possible life and greater possible durability. The determination of such mixture is often ascertainable, but the actual production of such a mixture is the perplexing problem. This optimum combination of elements must provide a certain amount of air voids and void in the mineral aggregate in the mixture to allow for bitumen content. This affects durablity, flexibility, and stability of the mixture.

The development of the present state of the art has been hampered in part by firstly, non-uniform design and testing standards that do not conform to specifications and acceptance standards, and secondly, the lack or understanding that only the quality (gradation, shape and absorption) of the fine aggregate, not that of the entire mixture of aggregates, is the only variable appreciably effecting the void volume. Appreciation of surface area of aggregate in determining the best proportions of asphalt to mineral aggregate and the importance of pore size on the permeability of the bituminous mixture is discussed in "The Movers Asphalt Pavement" by Clifford Richardson, New York, 1913. Engineers presently established a Job Mix Formula based on investigation and testing of only one gradation, thus not appreciating the range of possibilities in relation to the entire gradation spectrum of aggregates.

In addition to the problem of determining the quantity of various elements to be mixed, there exists other quality control problems that come about during the plant manufacturing and lay down process. Of particular importance is the task of maintaining a constant Job Mix Formula in view of the segregation and degradation of aggregates which occurs during crushing, storage, mixing, tumbling, and transporting and lay down operations.

Another problem often encountered in determining the exact amount of asphalt cement to be added to the mixture results from varying absorption characteristics of the mineral aggregate. Certain types of mineral aggregates absorb more or less asphalt cement, thereby causing the effective volume of asphalt cement in the mixture to vary accordingly, which ultimately affects the volume of voids filled by the bitumen. For example, should the aggregate used be visicular or permeable in nature, relatively more bitumen (asphalt cement) would be absorbed within the cracks, holes and crevices located therein. This absorption substantially affects the effective volume of asphalt cement available to fill the voids.

The amount of effective asphalt cement, which ultimately effects the amount of air voids, utilized within the asphaltic mixture must be closely controlled to produce desired results. Void volume control in the mixture is critical. Insignificant variations in the effective proportion of asphalt cement resulting from variations in aggregate absorption characteristics may substantially affect the life and quality of the pavement. Prior art methods for void control involve manipulations of the Job Mix FormUla over the entire gradation scale. Specific reference is made to Fuller maximum density curves and the Federal Highway Administration 0.45 Power Gradation Chart shown in "Mix Design Methods for Asphaltic Concrete and other Hot-Mix Type"

published by The Asphalt Institute, manual series no. 2, fourth edition, March, 1974. The basis for the FHA 0.45 power gradation chart is described in detail in volume 31, pages 176 through 207 of the "Proceedings of the Association of Asphalt Paving Technologist", Jan. 29, 1962.

Additionally, because aggregate from different rock quarries and pit locations have varying absorptive qualities, samples taken during the production process must be constantly monitored and analyzed in order to produce an even uniform pavement having consistent riding and frictional qualities. The present state of the art does not provide a viable method to obtain the desired analysis of production samples within a sufficient time period to make the necessary corrections at the plant site to compensate for such errors during production.

Due to the inability to precisely control the gradation as heretofore mentioned, contractors are constantly faced with the problem of meeting the stringent contractual Job Mix Formula specifications. A typical analysis of a sample mix may take days or weeks to determine whether the plant is functioning correctly. During that period of time, disastrous results in voidage control may have occurred during the lay down process thereby resulting in improper mix proportions, too high or too low amounts of asphalt cement, or the laying of open graded mixtures.

The premises considered, the special problems associated with conventional methods of construction of plant mix asphalt pavements may be summarized as follows:

(1) The asphalt tolerance is very critical and difficult to maintain during production due to the variable quality of aggregates;

(2) Uniformity of the mixture of mineral aggregates as represented by the Job Mix Formula is difficult to maintain due to degradation and segregation of aggregates during stockpiling, mixing, and transporting; and (3) Precise control of the air voids within the compacted mixture is difficult.

(4) Plant control to achieve the optimum combination of coarse and fine aggregates to place within the mixture is difficult to ascertain;

DESCRIPTION OF PRIOR ART

Prior art methods for obtaining optimum results for asphalt pavements have been attempted by many design engineers. The inventor has noted a patent issued to W. H. Flood on June 18, 1929, U.S. Pat. No. 171,445, wherein a combination asphalt and concrete pavement and method for producing the same is disclosed. It is recognized therein that the advantages of asphalt pavement include its plasticity, pliability, nonrigidity, resiliency, and ease of repair. It is particularly noted that optimum stability of the mixture is obtained when the stone particles are keyed together on themselves, and mortar or binder functioning only to fill the interestices or voids between the stone. More importantly, though, it is stated that this latter condition is impossible to secure by ordinary methods where all the ingredients are mixed together. The patentee therein also acknowledges the necessity to maintain the results in an unstable mixture with consequent displacement under traffic, while a slight deficiency causes a tendency to cracking and disintegration due to there not being sufficient asphalt to cement the coarse mineral aggregates firmly together.

U.S. Pat. No. 3,868,262 issued to Karl Ohlson on July 20, 1973 show that the coarser stone forms the stabilizing structure of the mixture while the smaller particles, together with the binder liquid, form a plastic mortar between the structural particles. The inventor therein has demarcated the coarse aggregate and the smaller particles by the 2 millimeter seive. The smallest aggregate size is limited by the 0.5 millimeter seive. The primary objective of the Ohlson invention is the control of homogeneity of the mix during the laying process. His invention specifically relates to control of the viscosity of the binder liquid by temperature control during the mixing process.

With respect to voidage control, a mathemathical method for computing voids in the mineral aggregate is disclosed in volume 34, pages 574 through 594 of the "Proceeding of the Association of Asphalt Paving Technologist". The computations are based upon the combined voidage, and successive correlations, of mineral voids for successive ranges in the gradation spectrum for the aggregate mixture. Page 577 of the treatise illustrates 8 gradation ranges between mineral filler (rock dust) and $\frac{3}{8}$ to $\frac{3}{4}$ inch aggregate. By summing the voidage contained in each group or range of aggregate, and considering the correlated effects on aggregate voidage, a sum total is obtained which closely approximates the final aggregate voidage. The critical disadvantage is this method is that no clue is given to how one might achieve this ideal combination of aggregate mixture at the actual mixing plant in view of segregation and degradation of aggregates during mixing and transporting. Also, no consideration is given to non-uniform absorption characteristics of aggregates generally.

Density curves have also been employed to control air voids as indicated in volume 31 of the "Proceedings of the Association of Asphalt Paving Technologist" mentioned previously. The theory is based on the principle that a gradation deviating from a maximum density curve will contain increased air voids. Again, no consideations are given to absorption factors, segregation, and degradation of aggregates.

In view of the foregoing, it is the objective of this invention to determine the optimum mixture of mineral aggregates and asphalt cement which are necessary to produce a pavement mixture having predetermined void volumes.

It is a further object of this invention to provide a method of quality control during the plant mix process of preparing asphalt compositions.

It is a further object of this invention to provide a method of design and analysis for asphalt pavements to account for the various absorptive qualities of the mineral aggregates.

It is a further object of this invention to provide a method for controllling the voids within the mineral aggregates in relation to the amount of asphalt cement used within the mixture.

Another object of this invention is to provide an asphalt concrete structure having optimum qualities in life, durability, wear resistance, weather resistance, hardness evenness of surface, skid resistance, and other optimum qualities.

Further an additional object of this invention will become more readily apparent upon review of the succeeding disclosure hereinafter more fully set forth.

SUMMARY OF THE INVENTION

The invention concerns a method for producing asphalt pavement composites, which composites consist essentially of aggregate and bitumen (asphalt cement).

This method is particularly useful for determining the appropriate aggregate portions, given a certain amount of asphalt cement, to achieve (during mixing operation) the desired air voids and void in mineral aggregate (VMA).

The invention comprises the use of a Riguez Index that is derived from a compacted sample of representative fine aggregates to be used in the mixing plant and a predetermined quantity of bitumen (asphalt cement), as a reference index to which graded composites of aggregates are compared. From the relationship produced by the comparison, the gradation of coarse and fine aggregates is readily ascertainable by interpolation to achieve and maintain a desired mix design. The method is particularly useful in that it may be implemented with any aggregate source, thus substantially eliminating the requirement of a particular type of fine aggregates as a design consideration.

DETAILED DESCRIPTION OF THE DRAWINGS

DESCRIPTION OF ILLUSTRATIVE EMBODIMENT

The principal features of this invention are based on the following facts:

(1) The Fine Mineral aggregate determines practically all the behavioral qualities of any Asphaltic Concrete mixture, except for the rigid strength provided by the Rock. The Fine Aggregate, once selected from whatever sources with whatever qualities, and properly proportioned, will not segregate or degrade in handling or mixing processes to any uncontrollable extent. Since this element retains its gradation, compacts to the upper limits of consolidation uniformly when lubricated with hot asphalt cement as a lubricant, and holds its compaction, the only variation within its own mixture will be due to the extent of compaction. However, the variation under a set compactive effort, such as the Marshall Method equivalent of 75 blows with a ten pound hammer-18 inch drop on both cheeks of a 2½ inch speciment for inches in diameter, is small. More importantly, the variation is predictable, because it changes in a known pattern within the usable ranges of the gradation scale for Asphaltic Concrete design.

(2) The quantity of Asphalt Cement changes slightly when holding its percentage to a constant amount by weight. This is because the aggregate weight changes in combinations. Nevertheless, more importantly, the effective Asphalt Cement is incompressible.

THE RIGUEZ INDEX

The Riguez Index is derived by compacting a representative sample of the processed Fine Mineral Aggregate and Asphalt Cement to the equivalent compactive effort of the Marshall Test. The compacted specimen will then yield its Bulk Density by weighing in air to determine weight and in water. This is the density in pounds/cubic foot of the Fines, and as in this illustration, with 5% Asphalt Cement. The amount of Asphalt Cement to be used can be slightly over or under the 5%, but it should be enough to cover the aggregate particles when mixed evenly at 230 degrees Farenheit, plus or minus 10 degrees Farenheit. For subsequent testing, after the final amount of Asphalt Cement is set by the Job Mix Formula, this amount should be used in this design method in the test specimen to exact proportion. About 1100 grams should be used for the representative test specimen. However, if the specimen does not produce 2½ inches in height, the size of the sample should be adjusted in amount to produce a 2½ inch compacted specimen to very close tolerances.

The density of the Fines for this test sample, contains the fines, a known amount of Asphalt Cement, and air. By subtracting the known amount of Asphalt Cement from the total Bulk Density, the weight of dry fine mineral agregate in pounds per cubit feet is derived. This weight of Fines is the Rigues Index and is defined herein as the DRY WEIGHT OF THE FINE MINERAL AGGREGATE PER CUBIC FOOT contained within its own volume plus the volume of the Asphalt Cement. The Riguez Index is not the actual density of the fine aggregate, as in normal terms. The Riguez Index can be extracted by any volumetric analysis.

Other information needed to practice the invention is the Bulk Specific Gravity (O.D. Basis) of the Rock and the Fines, together with its corresponding Effective Specific Gravity (SSD Basis), and the Specific Gravity of the Asphalt Cement. The Specific Gravities should be verified within Asphaltic Pavement mixtures soon after crushing operations start and the exact blends for the fines have been selected. As used herein, O.D. means Oven Dried, and SSD means Saturated Surface Dried.

The following illustrates the method of determining a Riguez Index from aggregates and Asphalt having the indicated specific gravities and apsorption qualities:

| Fine Aggregate: | |
|---|---|
| Bulk Specific Gravity | 2.676 (166.98#/CF) |
| Absorption | 1.07% |
| Effective Specific Gravity | 2.705 (168.79#/CF) |
| Sp. Gravity AR2000 Asphalt | 1.0146 (63.31#/CF) |

| Bulk Density of Riquez Index specimens: | |
|---|---|
| An average of two specimens with %5 Asphalt Cement | 2.247 |

Riquez Index computations:

2.247 × 62.4 = 140.21#/CF × 95% = 133.20#/CF of Fine Mineral Aggregate O.D. basis Absorption:

133.2# × 1.07% = 1.42#/1.66.98# = 0.85% in Volume 0.85% × 63.31# = 0.54# A.C.

-continued

Riquez Index SSD Basis = 133.2# + 0.54# = 133.74#/CF

GENERATING RIGUEZ VALUES

For use in volumetric calculation of the Riguez Values as a function of gradation, the Riguez Index will be 133.74#. The following information respecting aggregate and asphalt qualities are also used:

Coarse Aggregate:
Bulk Specific Gravity           2.708 (168.98#/CF)
Absorption                      1.84%
Effective Specific Gravity      2.758 (172.10#/CF)

Fine Aggregate:
Bulk Specific Gravity           2.676 (166.98#/CF)

-continued

Absorption                      1.07%
Effective Specific Gravity      2.705 (168.79#/CF)
Specific Gravity AR2000 Asphalt 1.0146 (63.31#/CF)

The Bulking Point of a representative sample in gradation of the Coarse Aggregate:
An Average of Four Tests        85#

Figure 1A:
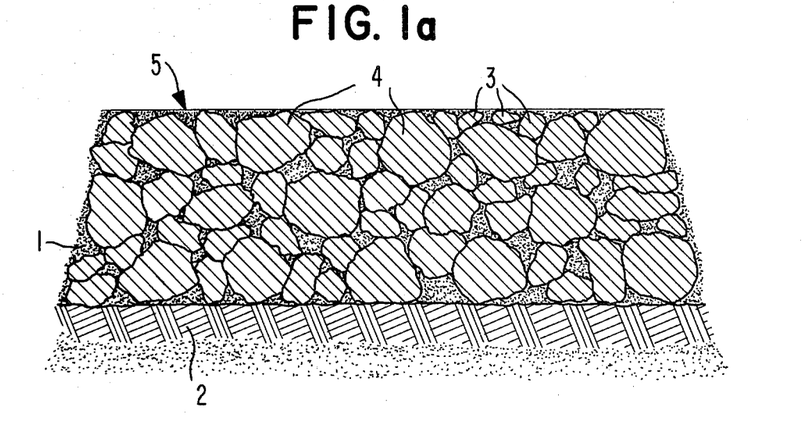
FIG. 1(a) shows the aggregate relationship of a preferred structure.
Figure 1B:
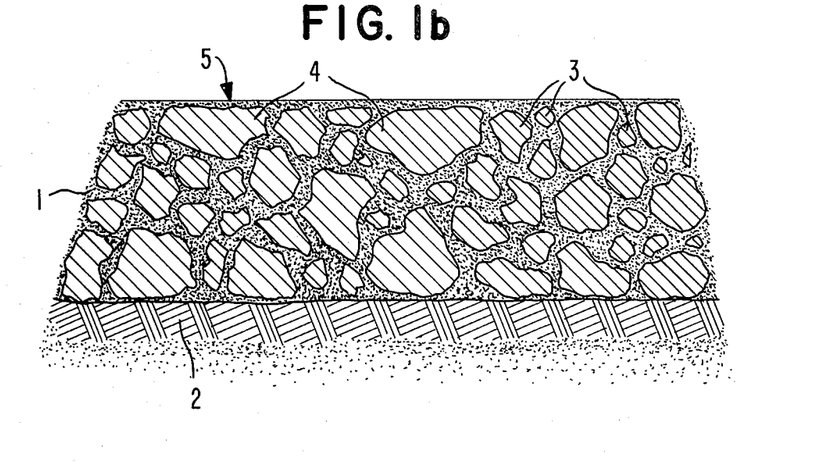
FIG. 1(b) illustrates a pavement composition having an excess amount of fine aggregates.
Figure 1C:
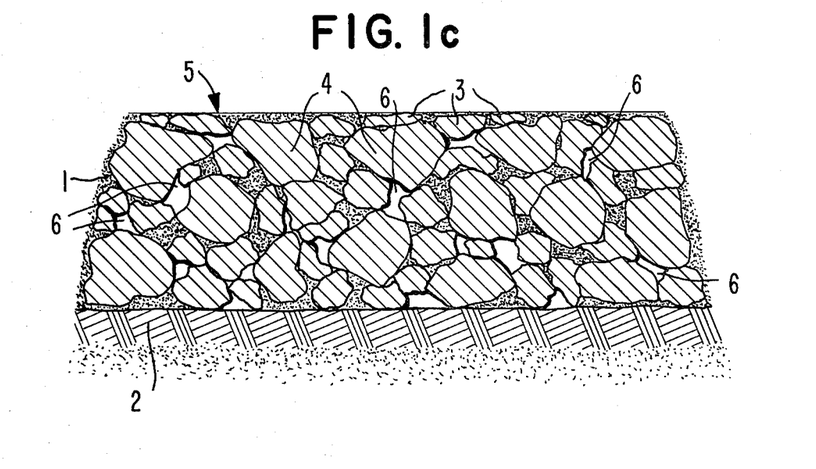
FIG. 1(c) illustrates a pavement composition having an inadequate amount of fine aggregates.
Figure 2A:
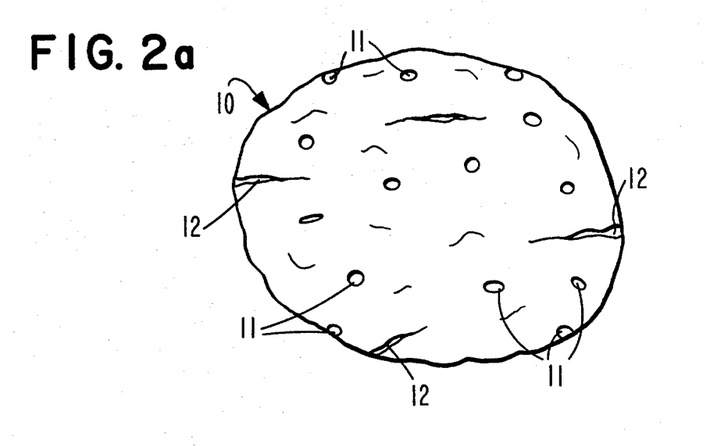
FIGS. 2(a), 2(b) and 2(c) illustrate the viscular or permeable nature of mineral aggregates which may comprise the coarse aggregates of the asphalt pavement.
Figure 2B:
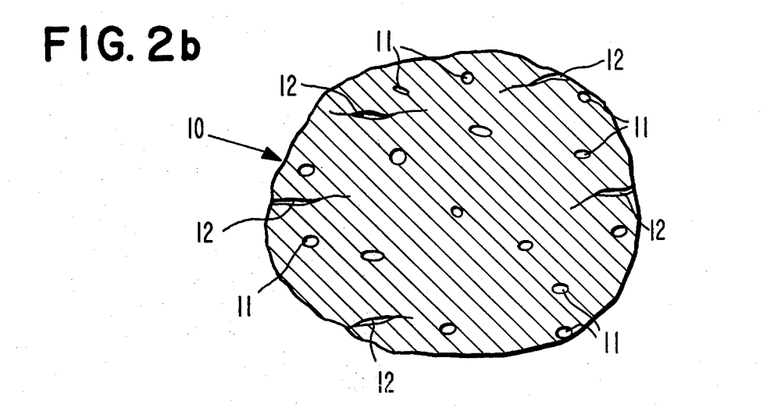
Figure 2C:
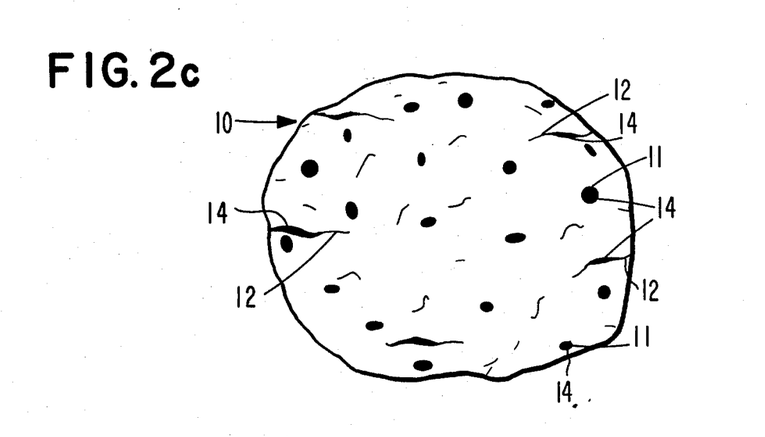
Figure 3:
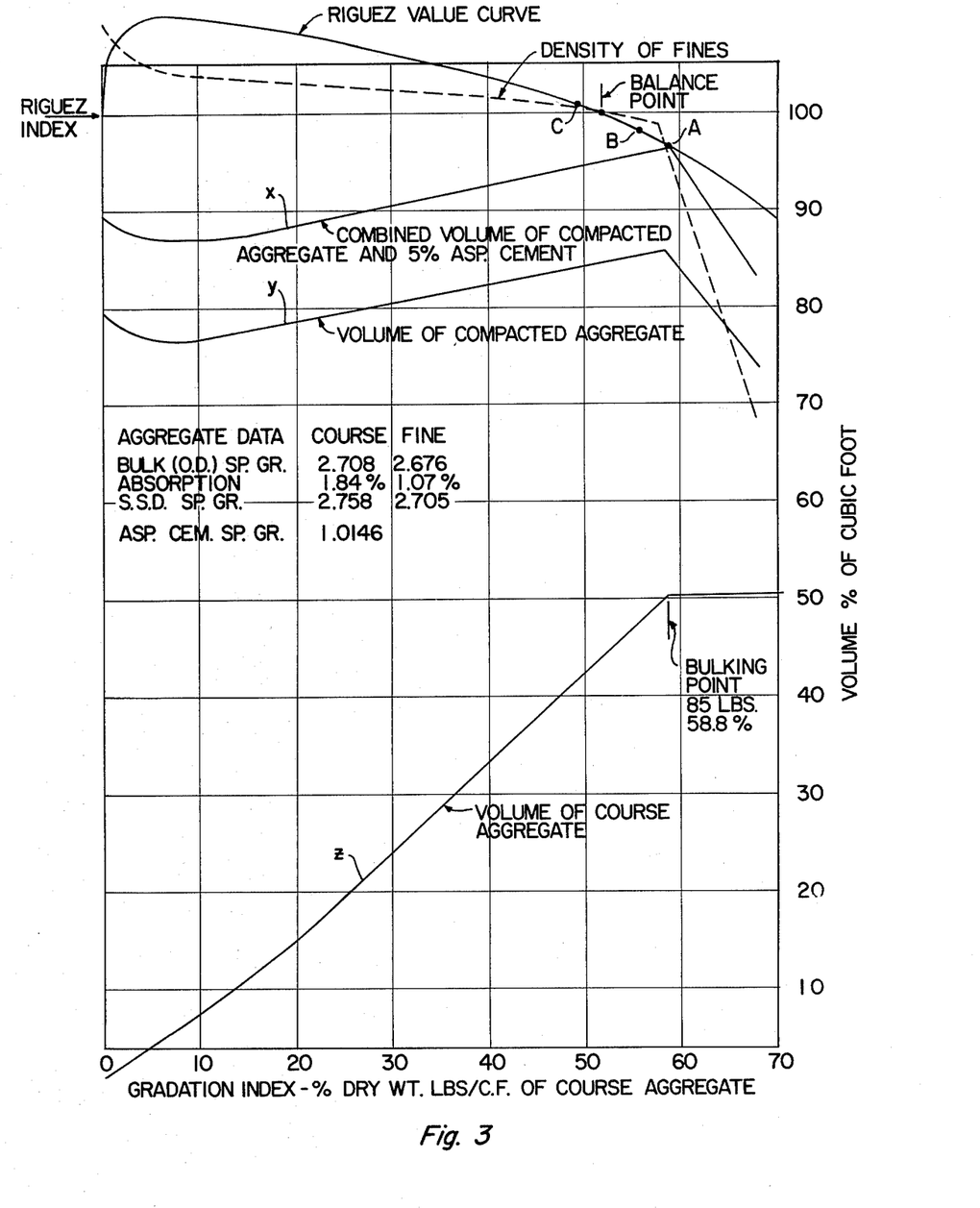
FIG. 3 illustrates the relation between certain volumetric representations of the coarse aggregates under saturated surface dried conditions and the gradation.
Figure 4:
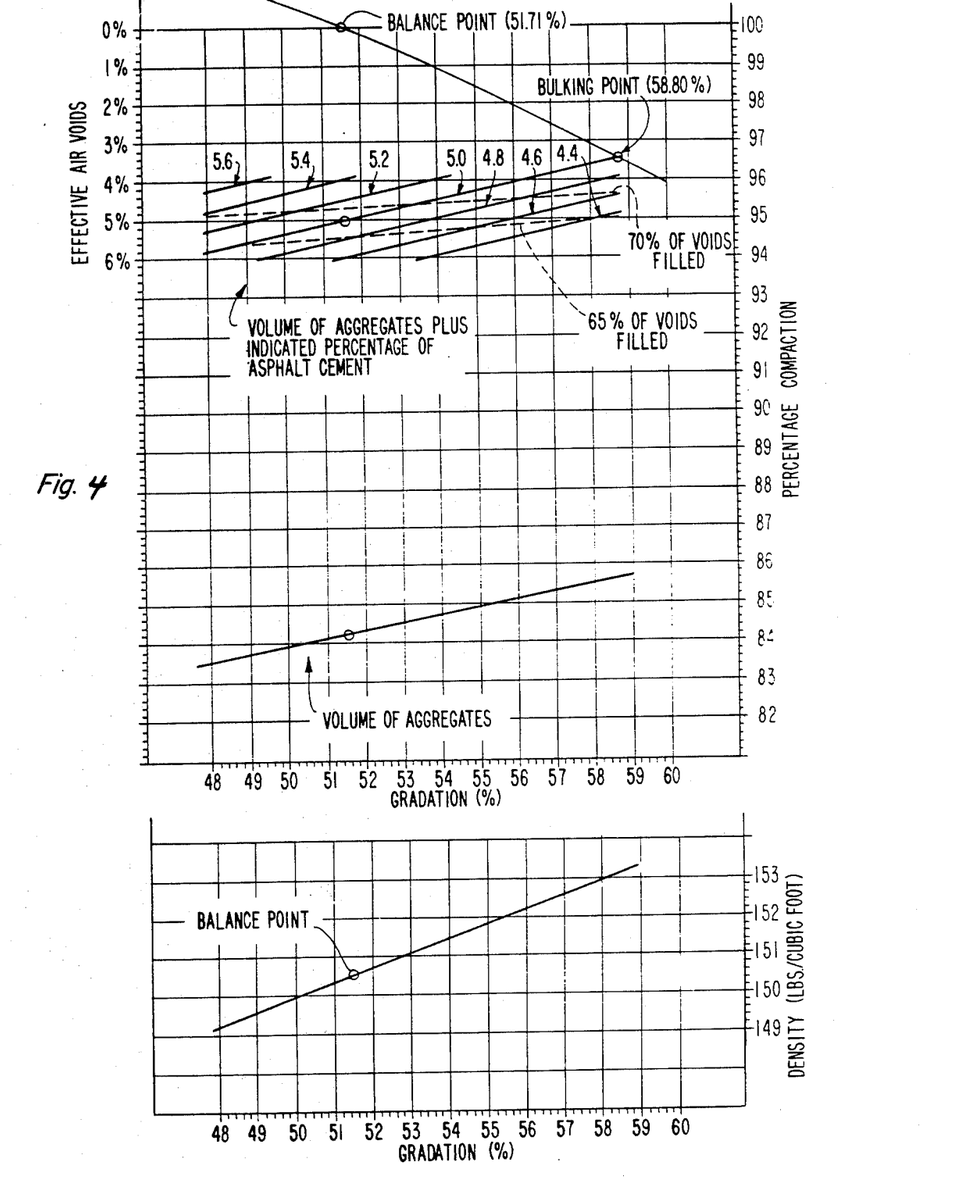
FIG. 4 illustrates an important section of the curves shown in FIG. 3 and is particularly useful for asphalt design purposes.

Each calculation is described produces a corresponding point on Riguez Value Curve of FIG. 3 and FIG. 4. Starting at the Bulking Point, 85# of Rock, the gradation point for point A, as has already been determined by test, and then using lesser amounts of Rock in subsequent calculations for points B and C, we scan the gradation scale at each point of importance for dense graded mixtures. The calculations for three points are shown in the following tables.

POINT A - CALCULATIONS OF VOLUMETRIC VALUES OF MIX WITH 85# OF ROCK

| # | Description | Value |
|---|---|---|
| 1. | 85#/168.98# CF Dry Rock | 50.30% |
| 2. | Program 5% desired effectiver air | 5.00% |
| 3. | Volume occupied by Rock plus 5% Effective Air | 55.30% |
| 4. | Volume available for Fines plus Asphalt Cement (100-55.30) | 44.70% |
| 5. | Dry Weight of Fines to 1 CF: 133.2# × 44.70% | 59.54# |
| 6. | Combined Dry Weight of Aggregates 85# plus 59.54# | 144.54# |
| 7. | Percentage Rock Dry Weight of Aggregate 85#/144.54# | 58.80% |
|   | Calculations one through seven represent quantities for the dry weight proportion; that is, the condition of aggregates in the hot, dry mixing stage after any moisture has been removed and before the Asphalt Cement has been added. By now adding 5% Asphalt Cement, the analysis continues. | |
| 8. | Total Weight of mix without absorption factors 144.54#/95% | 152.152# |
| 9. | Absorption:    85# × 1.84% = 1.56#/168.98#CF | 0.92% |
|   | 59.54# × 1.07% = 0.64#/166.98#CF | 0.38% |
|   | Absorption on the basis of combination | 1.30% |
| 10. | Asphalt Cement Absorbed 1.30% × 63.31#C | 0.82# |
| 11. | 0.82#/152.15# = 0.54% on the basis of Total Mix. | |
| 12. | 0.54% × 95% = 0.51% on the basis of total aggregates. | |
| 13. | Effective Asphalt Cement 5.00%-0.51% | 4.49% |
|   | Absorption values within a range of the gradation scale will be practically the same. The analysis from this point will be on the mixture with absorption factors: | |
| 14. | Volume of Rock 85# + 1.56# = 86.56#/172.10# | 50.30% |
| 15. | Program 5% Effective Air | 5.00% |
| 16. | Volume occupied by Rock plus 5% Effective Air | 55.30% |
| 17. | Volume available for Fines plus A.C. (100%-55.30) | 44.70% |
| 18. | SSD Weight of Fines to 1CF = 133.74# × 44.70% | 59.78# |
| 19. | SSD Weight of Aggregates 86.56# + 59.78# | 146.34# |
| 20. | Total Weight of Mixture 146.34#/100-4.49% | 153.22# |
| 21. | Weight of Effective Asphalt Cement 153.22#-146.34# | 6.88# |
| 22. | Final Volumetric Analysis: | |
|   | Total Weight | 153.22# |
|   | Effective Asphalt Cement | 6.88# |
|   | SSD Weight of Aggregates | 146.34# |
|   | SSD Wt. Rock   86.56#/172.10# = 50.30% Volume of Rock | |
|   | SSD Wt. Fines  59.78#/168.79# = 35.42% Volume of Fines | |
|   | 85.72% Volume of Aggr. | |
|   | 100-85.72% = 14.28% Voids in Mineral Aggregate | |
|   | 6.88#/63.31# = 10.87% Volume of Effective A.C. | |
|   | 3.41% Volume of Effective Voids | |
| 23. | Percentage Voids Filled 10.87%/14.28% | 76.12% |
| 24. | Calculated Voidless Mix 153.22#/100-3.41% | 158.63#CF |
| 25. | Checkout Riquez Index 59.78#/35.42% plus 10.87% | 129.14#CF |
| 26. | Riquez Value of original Index 129.14#/133.74# | 96.56% |

POINT B - CALCULATIONS OF VOLUMETRIC VALUES OF MIX WITH 80# ROCK

These calculations with identical values of Riquez Index, Effective Air and Asphalt Cement, as were used for Point A.

| | | |
|---|---|---|
| 1. | 80#/168.98# = CF Dry Rock | 47.34% |
| 2. | Program 5% desired Effective Air | 5.00% |
| 3. | Volume occupied by Rock plus Effective Air | 52.34% |
| 4. | Volume available for Fines plus Asphalt Cement (100−52.34) = | 47.66% |
| 5. | Dry Weight of Fines to 1 CF 133.2# × 47.66% | 63.48# |
| 6. | Combined Dry Weight of Aggregates 80# + 63.48# | 143.48# |
| 7. | Percentage Rock Dry Weight of Aggregate 80#/143.48# | 55.76% |
| 8. | Total Weight of mix without Absorption 143.48#/95% | 151.03# |
| 9. | Absorption: 80# × 1.84% = 1.47#/168.98#CF | 0.87% |
| | 63.48# × 1.07% = 0.68#/166.97#CF | 0.41% |
| | Absorption on the basis of combination | 1.28% |
| 10. | Asphalt Cement Absorbed 1.28% × 63.31# | 0.81# |
| 11. | 0.81#/151.03# = 0.54% on the basis of Total Mix. | |
| 12. | 0.54% × 95% = 0.51% on the basis of total aggregates. | |
| 13. | Effective Asphalt Cement 5.00%−0.51% | 4.49% |
| 14. | Volume of Rock 80# + 1.47# = 81.47#/172.10# | 47.34% |
| 15. | Program 5% Effective Air | 5.00% |
| 16. | Volume occupied by Rock plus 5% Effective Air | 52.34% |
| 17. | Volume available for Fines plus A.C. (100%−53.34%) | 47.66% |
| 18. | SSD Weight of Fines 133.74# × 47.66% | 63.74# |
| 19. | SSD Weight of Aggregates 81.47# + 63.74# | 145.21# |
| 20. | Total Weight of Mix 145.21#/100%−4.49% | 152.04# |
| 21. | Weight of Effective Asphalt Cement 152.04#−145.21# | 6.83# |
| 22. | Final Volumetric Analysis: | |
| | Total Weight | 152.04# |
| | Effective Asphalt Cement | 6.83# |
| | SSD Weight of Aggregates | 145.21# |
| | SSD Wt. Rock 81.47#/172.10#  47.34% Volume of Rock | |
| | SSD Wt. Fines 63.74#/168.79#  37.76% Volume of Fines | |
| | 85.10% Volume of Aggr. | |
| | 100%−85.10% = 14.90% Voids in Mineral Aggregates | |
| | 6.83#/63.31# = 10.79% Volume of Asphalt Cement | |
| | 4.11% Volume of Effective Voids | |
| 23. | Percentage Voids Filled 10.79%/14.90% | 72.42% |
| 24. | Calculated Voidless Mix 152.04#/100%−4.11% | 158.55# |
| 25. | Checkout Riquez Index 63.74#/37.76%−plus 10.779% | 131.29# |
| 26. | Riquez Value of original Index 131.29#/133.74 | 98.27% |

POINT C - CALCULATIONS OF VOLUMETRIC VALUES OF MIX WITH 70# ROCK

These calculations with identical values of Riquez Index, Effective Air and Asphalt as were used for Points A and B.

| | | |
|---|---|---|
| 1. | 70#/168.98# = CF Dry Rock | 41.43% |
| 2. | Program 5% Desired Effective Air | 5.00% |
| 3. | Volume occupied by Rock plus 5% Effective Air | 46.43% |
| 4. | Volume available for Fines plus Asphalt Cement (100−46.43) | 53.57% |
| 5. | Dry Weight of Fines 133.2# × 53.57% | 71.36# |
| 6. | Combined Dry Weight of Aggregates 70# + 71.36# | 141.36# |
| 7. | Percentage Rock Dry Weight of Aggregate 70#/141.36# | 49.52% |
| 8. | Total Weight of mix without Absorption 141.36#/95% | 148.80# |
| 9. | Absorption: 70# × 1.84% = 1.29#/168.98#CF | 0.76% |
| | 71.36# × 1.07% = 0.76#/166.98#CF | 0.46% |
| | Absorption on the basis of combination | 1.22% |
| 10. | Asphalt Cement Absorbed 1.22% × 63.31# | 0.77# |
| 11. | 0.77#/148.80# = 0.52% on the basis of Total Mix. | |
| 12. | 0.52% × 95% = 0.49% on the basis of total aggregates. | |
| 13. | Effective Asphalt 5.00%−0.49% | 4.51% |
| 14. | Volume of Rock with Absorption 70# + 1.29# + 71.29#/172.10# = | 41.43% |
| 15. | Program 5% Effective Air | 5.00% |
| 16. | Volume occupied by Rock plus 5% Effective Air | 46.43% |
| 17. | Volume available for Fines plus A.C. (100%−46.43%) | 53.57% |
| 18. | SSD Weight of Fines 133.74# × 53.57% | 71.64# |
| 19. | SSD Weight of Aggregates 71.29# + 71.64# | 142.93# |
| 20. | Total Weight of Mix 142.93#/100%−4.51% | 149.68# |
| 21. | Effective Weight of Asphalt Cement 149.68#−142.93# | 6.75# |
| 22. | Final Volumetric Analysis: | |
| | Total Weight | 149.68# |
| | Weight of Effective Asphalt Cement | 6.75# |
| | SSD Weight of Aggregates | 142.93# |
| | SSD Wt. Rock 71.29#/172.10#  41.42% Volume of Rock | |
| | SSD Wt. Fines 71.64#/168.79#  42.44% Volume of Fines | |
| | 83.86% Volume of Aggr. | |

-continued

| POINT C - CALCULATIONS OF VOLUMETRIC VALUES OF MIX WITH 70# ROCK | | |
|---|---|---|
| 100%−83.86% | = 16.14% Voids in Mineral Aggregates | |
| 6.75#/63.31# | = 10.66% Volume of Effective A.C. | |
| | 5.48% Volume of Effective Voids | |
| 23. Percentage Voids Filled 10.66%/16.14% | | 66.05% |
| 24. Calculated Voidless Mix 149.68#/100%−5.48% | | 158.35# |
| 25. Checkout Riquez Index 71.64#/42.44% plus 10.66% | | 134.91# |
| 26. Riquez Value of original Index 134.91#/133.74# | | 100.87% |

TABLE 5

| CALC. NUMBER | VALUE | POINT A | POINT B | BALANCE POINT | POINT C |
|---|---|---|---|---|---|
| 1 | # Rock | 85 | 80 | 73.48 | 70 |
| 7 | % Rock | 58.80 | 55.76 | 51.71 | 49.51 |
| 13 | % Eff. A.C. | 4.49 | 4.49 | 4.50 | 4.51 |
| 20 | T.W. #'s | 153.22 | 152.04 | 150.49 | 149.68 |
| 22 | Vol % Rock | 50.30 | 47.34 | 43.39 | 41.42 |
| 22 | Vol % Fines | 35.42 | 37.76 | 40.82 | 42.44 |
| 22* | Vol % Aggr. | 85.72 | 85.10 | 84.31 | 83.86 |
| 22 | % VMA(voids) | 14.28 | 14.90 | 15.69 | 16.14 |
| 22* | Vol Eff. A.C. | 10.87% | 10.79% | 10.69% | 10.66% |
| 22 | % Eff. Voids | 3.41 | 4.11 | 5.00 | 5.48 |
| * | Total Vol. | 96.59 | 95.89 | 95.00 | 94.52 |
| 23 | % Voids Fill | 76.12 | 72.42 | 68.13 | 66.05 |
| — | 70% Void Fill | 95.72 | 95.53 | 95.29 | 95.16 |
| — | 65% Void Fill | 95.00 | 94.74 | 94.51 | 94.36 |
| 26 | Riquez Value | 96.56 | 98.27 | 100.00 | 100.87 |

(Total Vol. represents combined volume of aggregates and effective asphalt cement)

Referring to FIG. 3 and Table 5, THE BALANCE POINT IS SHOWN TO BE FOUND BY INTERPOLATING THE RIGUEZ VALUE CURVE AT THE POINT OF INTERSECTION OF 100% COMPACTION VALUE OF THE RIQUEZ INDEX BETWEEN POINT B AND C. Values shown can be determined graphically or calculated from interpolated data.

The gradation Index is the percentage of Rock retained on the #4 Screen. The percentage of Fines is its complementary value at each point. The vertical scale on both sides is the VOLUME PERCENT OF CUBIC FOOT, and from the 100% mark down is PERCENTAGE VOLUME OF EFFECTIVE VOIDS. The TOTAL WEIGHT of the mix is also plotted against the same gradation index with the pounds/cubic foot at the right side. This will only apply to the total weight line. The RIGUEZ VALUES plotted at the top against the gradation index is actually Percentage Compaction of the original test and not a volumetric measurement.

All RIGUEZ values for the calculations at interval points on the graphs of FIGS. 3 and 4 for points A, B, and C, can be calculated by using progressively descending amounts of Rock.

Line x of FIG. 3 for the TOTAL VOLUME of the compacted aggregates with 5% total asphalt cement is the principal line to evaluate the variations in combination. In this illustration, this checked out 45 of 47 Marshall test analysis values from the "as built" official test samples, because the consolidation values fairly well matched the 5% programmed effective air. However, the Riquez test had to be checked once after the plant samples had shown that the Coarse Aggregate Intermediate Stockpile had degraded an average of 15%. This illustration shows the changed or final Riquez Index value. Many other fines can show higher consolidation values that will cause the Total Volume curve to be higher than 5% programmed effective air. However, the Balance Point will not change appreciably, and adjustments for changing aggregate must be made with monitoring the plant regardless. The lines parallel to the total volume line are estimations of 0.2% Asphalt Cement increments, approximately 0.48% in Volume to evaluate core samples from the finished pavement.

ASPHALT PAVEMENT DESIGN USING RIGUEZ INDEX

The main design tool is the Riquez Index which is derived from the fines compacted to the equivalent Marshall Test compactive effort. This establishes a basis for deriving the complimentary amount of Fines in combination with the Rock at interval points of the gradation scale. The Effective Voids, when balanced with the consolidation value, is the only unknown in the equation. By setting the equation to search for 5% Effective Air, the Balance Point is found. It is shown to be ascertained by interpolation on the Chart of FIG. 3 as the point that satisfies the equation. Five percent of Air programmed renders 5% Effective Air. At this point the Riquez Value Curve will intersect the 100% value. All other points analyzed are not balanced because of the inability of the particles to crowd together under the conditions set by the equation. At the Balance Point, lesser amounts of Programmed Air will also satisfy the equation, and this means that it is possible to consolidate the aggregates to a greater amount than the 5% programmed air. The consolidation value (Total weight of the combined aggregates in the compacted state by the Marshall Compaction effort) increases, depending on the amount of effective air flushed out. Compacted aggregate consolidation to a higher degree than desired is a main design function, and directly related to the QUALITY of the Fines, particularly in the ranges below the #16 Screen. When the #40 Screen sized aggregate is high, the consolidation value will be higher than for "well-graded" Fines. Furthermore, mixes on the "sandy side" of the Balance Point will consolidate even higher as the Riquez Index will show. Under all design considerations in the original selection of the Fines combination, the selection of Fines in this range should be "well graded" Fines. The excess amount of Fines is what flushes the Effective Air, and this will affect the amount of Asphalt Cement possible to use in the mix. When the Fines are composed of hydraulically deposited sources with spherical shapes along with a "sandy side" selection, the mix will be of a much lesser structural quality. What causes the higher consolidation will also cause swelling and kneading of the resultant pavement. This is the quality measured and controlled by the Riguez Index as the Quality and Quantity of the mortar thickness to render the best combination at the Balance Point for that particular selection of total aggregates. Neither the Marshall Method, using trial and error, nor the Hveem Method, approximating the Asphalt Cement by using motor oil and kerosene with particular Fine combinations analyzes this quality as the Riquez Index will do.

In the combinations of these aggregates, as illustrated, the Balance Point is reached at 51.7% Rock and 48.3% Fines. The values, either coarser or finer from this Balance Point, will not be absolutely correct. However, within a few percentage points of the Balance Point on either side, due to small amounts of variations in the elements, the values are accurate enough to give indicative results. The nearer to the Balance Point, the greater will be the accuracy. FIG. 3 shows the total picture of the aggregates in combination throughout the full range of the gradation scale starting with 100% Fines, the origin of the Riguez Index. Both the Riguez Value Curve and the actual Density of the Fines curves are plotted to show the full extent of this Design Method. The Density curve has been plotted to show how the Density of the Fines drops so radically beyond the Bulking Point of the Rock.

FIG. 4 shows the same values on an expanded scale to show the range of gradation on the #4 Screen pertinent to dense graded Asphaltic Concrete combinations. At the Balance Point in this illustration, the actual Density of the Fines is 121.90#/CF, and the Riguez Index is 133.74#/CF, the same as at the beginning with no Rock. Both values are identical in value at the beginning with no Rock at 133.74#/CF. With small amounts of Rock, example at 15% Rock, the Riguez Index will increase appreciably because the Fines are occupying less space due to the increase in volume of Rock. In this same change of the gradation scale, the actual Density of the Fines decreases in value for the same reasons. As increasing amounts of Rock are introduced into a mix, progressive amounts of air will be flushed out of the mixtures. The constant compactive effort, Marshall Method equivalent, on the progressive combinations of the two elements, is actually subjecting the Fines to higher pressures since the Fines progressively decrease in quantity of the total mix. But, because the Fines are being subjected to the upper limits of consolidation, the changing pressure only consolidates the Fines in very small increments. This pattern continues in a fairly constant way right up to the Bulking Point.

This basic behavior or aggregate consolidation will occur with any similar aggregates used in the production of Asphaltic Concrete. Before the Bulking Point is reached in this consolidation process, the Balance Pont is the point at which the Fines will again match its original Riguez Index value in pounds per cubic foot. Mixes on the "sandy side" of the balance point have increasing swell factors the sandier it gets. The capacity of the excess quantity of Fines to compact and rebound from higher pressures will be minimized as the proportions of Fines decrease in quantity up to the Balance Point. From the Balance Point to the Bulking Point, the Fines are unable to fill the voids created by greater amounts of Rock because of the resistance of the Rock to the pressure, even when the weight of the total mix is increasing in value. Beyond the Bulking Point, the Rock is creating so much void space that the Fines decreasingly will not fill. The pressure is being transmitted entirely by the Rock particles, thus the very last viable point of analysis for dense graded mixes is at the Bulking Point. The bulking Point is also the point at which "open graded" mixes begin.

This illustration represents and reveals in detail all the technical aspects of the Riguez Index method of design. It is a design method, since it selects particular gradation combinations by their natural qualities that will use the particular aggregates for the intended purpose, and details what these combination are related one to the others. The Asphalt Cement to go with each gradation selection is also given in much more detail than for established methods used for design today. The time required to perform all the testing used in this method will now be so much shorter that results can be obtained in hours instead of weeks. The principal design feature to select proper combinations is very easy to execute, both for the laboratory work and computations. This feature will now allow Paving Contractors to design their mixes, evaluate better sources of aggregates, give exacting bids, and, more important, to have a very meaningful understanding of the proper design of their product by their own forces and control.

PLANT CONTROL PROCEDURES

After aggregates have been crushed, belt sample are taken periodically for determining gradations and adjustments are made to keep gradations within requirements.

Two composite samples of the Fine Aggregate proposed (representative composite screen-by-screen samples passing the No. 4 Screen) are prepared. The Riguez Index is determined, and the Riguez Value Chart made to find the Balance Point, or the values at the Job Mix Formula selected.

When different blend sands are proposed, a set of Riguez Indices for each combination of Fines with these sands is determined. The best graded combination and generally the one with higher crushed Fine Aggregate combination should have been selected.

Soon after crushing operations have progressed to the point that gradations show good consistency and the general trend of the crushing is established from the belt samples, two identical specimens of the Job Mix Formula selection, and the limits of the Job Mix Formula as varied on the #4 Screen are mixed exactly on a screen-by-screen amount basis. The two specimens of each mix are heated and mixed by Marshall Method standards and subjected to the Marshall Method compaction of 75 blows on each cheek of the 4 inch diameter by 2½ inch height specimens. The consolidation and volumetric values which comprise the Riguez Values are then plotted against these Indices to predict the variations in all principal values for the mix. Although the typical Job Mix Formula specifications will allow certain tolerances on each screen, the specimens prepared for the limits of the Job Mix Formula on the sandy and rocky sides are to be blended by varying the amount of Fine Aggregate plus or minus 5%. The resultant gradation of these specimens will reflect a tolerance of 5% on the No. 4 Screen with lesser tolerances on higher or lower screens than the No. 4 Screen. These limits of mixes represent what a blend of aggregates would be if the proportions of Fines to Rock are changed by 5%. The results from these tests produce three points, A, B, and C on the gradation scale of FIGS. 3 and 4 on the Job Mix Formula and 5% on either side to plot on the Riguez Value Chart. This preliminary information is all that is needed to calibrate the plant and start production. The second specimen for each mix is to check the accuracy of testing. The two samples are averaged for use in analysis.

PROCEDURES TO CALIBRATE AND MONITOR PRODUCTION

To calibrate and monitor the production process, the principal value in mixing to the Job Mix Formula is to set the bins to the proportions of Coarse and Fine aggregate to the very best adjustment possible; that is, the control of the No. 4 Screen. The secondary control of Intermediates to Coarse Aggregate proportion must also be set and adjusted after the No. 4 Screen main settings are made. The total pavement evenness in quality depends on the control of the No. 4 Screen separation meeting the required amount. In practice, the No. 4 Screen is the screen that is the easiest to control because of the bin separations and plant controls that are geared towards direct and positive adjustment at this point. No other bin adjustment has this feature of adjustment to control the mix. The Most important control of the mixture is at the cold feed system. Gate openings and belt speed setting for each bin should be set to produce a blend as close to the required mix as possible by actual calibration setting to produce the required component. In old plants with batch type equipment, the final mix is blended to exact proportions after the aggregates are heated and rescreened. However, the cold feed has to be in proper settings so that the material is not heated and wasted. Overloading of one bin in the screening batch unit is not conductive to good production. In the newer "drum-roll" plants, the cold feed settings and calibration is the total Job Mix Formula adjustment. These plants have very sophisticated cold feed systems with automatic adjustments, and belt delivery that actually weighs the materials while the plant is in operation. There are mechanisms to interrupt the main belt feed to obtain representative samples by diverting the belt sample into a huge splitter while in operation. The cold feed sample gradation only takes minutes to perform and the split sample can also be used to run the Riguez Index test. Heating of this representative specimen can be done in minutes with a micro-oven.

The next important control value is the amount of Asphalt Cement. Small amounts over or under the required amount will cause fluctuations in the mix to the same extent as the amounts off the requirement. The volume change in the mix is more significant because by weight Asphalt Cement occupies 2½ times the volume that aggregates occupy. The effective voids will vary to the same extent, and, in the final analyss, this element must be controlled, or else the mix will not be consistent, and may either flush out these valuable voids or allow too much effective air to remain permanently in the mix. Most plants have very good automatic pumps that meter the hot asphalt cement to very close Job Mix Formula tolerances into the mix whether the pump is set to a fixed amount or, as in the "drum-roll" plants with continuous control set to a percentage of the weight of the mix. Extraction tests will indicate very close Job Mix Formula requirements are met. Of course, the pumps must perform normally. When a mix has been adjusted and is in conformance with the Job Mix Formula, the extractions will show that the Asphalt Cement amount will be to very close tolerance with the requirement. However, a sample showing slightly on the "sandy" side of the mix will show a slight increase in the asphalt cement content; likewise, a sample of the "rocky" side will show a slight decrease in the asphalt content. The is due to the affinity of the asphalt cement to cover the settings for the asphalt cement. It only indicates that the Asphalt Cement will fluctuate due to the fines varying. It is most important that the "as built" pavement sampling is done accurately in getting representative samples. A one foot by six foot flat plate placed ahead of the laydown machine, and picking up the sample with a special narrow box-shaped shovel the full length of te plate is considered to be the best way to pick up a five gallon bucketfull of the mix. This bucket full of mix is then split down to smaller appropriate portions by seperating equal pie cut parts after the total sample is thoroughly mixed on a rubber sheet. For the Marshall Compaction and Void Analysis information, it is required to extract the asphalt cement and perform a gradation on the No. 4 Screen in order to get accurate information after the specimen has been compacted, and the Bulk Specific Gravity of the specimen has been determined. Specimens analyzed in this way will give good results. The split sample for gradation purposes will not consistently give accurate results for the Marshall Compaction unless the two split samples are perfectly split which in a greater number of cases is unlikely. Splitting techniques are not that accurate on small samples.

The main control test to monitor the total production quality with the aggregates and amount of asphalt cement is the Riguez Index test. Of course, the test will monitor any combinations within the ranges of proportions pertinent to dense graded mixtures. It will indicate the Balance Point as has already been described, the point at which the combinations will produce a mixture in which the greatest usage in quality for all the elements are to be found. This test would be required once a day for the first two days of production, and an occasional test after that when the materials are not changing appreciably in gradation. The Riguez Test and subsequent volumetric analysis will measure the quality and quantity of the mortar during production. This test will also pinpoint any quality for any mixture that may have been erratically laid due to malfunction of the plant, as so often happens. The test can be performed before the pavement gets cold, if removed as indicated. It is much easier to remove a hot pavement from sections of cold specified areas than a cold one.

The mixture can be adjusted on a continuous basis while testing is progressing. In a normal operation, the gradation of the mixture will change to some degree or another, depending on the stockpiling, handling and feeding operations. Therefore, it is mandatory to appreciate what the plant is being fed. What goes in will be what the mixture will contain except for very minute amounts lost in the process of mixing. The Riguez Index test, by its difference in weight, will detect a change in the quality and the quantity of the mortar, since most aggregates will degrade or segregate to the point the coarser aggregates will increase the quantity of the Fine aggregate, especially in the coarser ranges of the Fines, that were not contained during the crushing process. This causes the quality of the Fines to change, and the weight of the Riguez Index to change with it, generally increasing in value, to show the degradation or segregation.

Regular gradation tests alone will not detect this condition because the addition of Fines from the Coarse aggregate may have a different Specific Gravity and shape. This will affect the mix. The Balance Point will also change due to this condition, and bin adjustments are needed to adjust the mix back to proper proportions. The test is also responsive when new blend sands are being stockpiled while production is in progress. The blend sand can change in gradation even when mined from the same source, due to its natural formation. The quality of the Fine Mineral Aggregate (No. 4 Screen-sized aggregate), as has been explained previously, control the quality of the final pavement. The Riguez Index Test is responsive to the quality change of the fines in the production stages.

I claim:

1. A mix design method for an asphalt paving mixture that includes coarse aggregates, fine aggregates, a predetermined quantity of asphalt cement, and a predetermined volume of voids, said method being useful for determining a specific gradation of coarse and fine aggregates to be combined in the mixture so that the mixture, when compacted, contains said predetermined volume of voids, which method comprises:

(a) Demarcating the aggregates to define coarse and fine aggregates,
(b) Mixing a reference sample of said fine aggregates with said predetermined quantity of asphalt cement,
(c) Compacting said reference sample,
(d) Determining a Riguez Index for said compacted reference sample,
(e) Generating a Riguez Value function as a function of gradation of coarse aggregates and fine aggregates, and
(f) Comparing the Riguez Value function of step (e) with the Riguez Index of step (d) and selecting a gradation wherein the Riguez Value function equals the Riguez Index within a predetermined range whereby an actual mixture of aggregates of the selected gradation with said predetermined quantity of asphalt cement will contain, after compaction, said predetermined volume of voids.

2. The invention of claim 1 wherein the mixing and compacting of steps (b) and (c) are performed by the Marshall Method.

3. The invention of claim 1 wherein the coarse and fine aggregates are demarcated by the number 4 seive.

4. The invention of claim 1 wherein the coarse aggregates substantially consists of aggregates having a mean diameter of not less than one-fourth inch and not more than one and one-half inches.

5. The invention of claim 1 wherein the fine aggregates consists of not less than 40 percent crushed aggregates.

* * * * *